United States Patent
Lechner et al.

(10) Patent No.: US 8,662,543 B2
(45) Date of Patent: Mar. 4, 2014

(54) PLUG-TYPE CONNECTOR FOR MEDIA LINES

(75) Inventors: Martin Lechner, Lindlar (DE); Frank Zenses, Hürth (DE); Evelin Rosowski, Gummersbach (DE)

(73) Assignee: VOSS Automotive GmbH, Wipperfurth (DE)

( * ) Notice: Subject to any disclaimer, the term of this patent is extended or adjusted under 35 U.S.C. 154(b) by 0 days.

(21) Appl. No.: 13/582,812

(22) PCT Filed: Dec. 3, 2010

(86) PCT No.: PCT/EP2010/068806
§ 371 (c)(1),
(2), (4) Date: Sep. 5, 2012

(87) PCT Pub. No.: WO2011/107174
PCT Pub. Date: Sep. 9, 2011

(65) Prior Publication Data
US 2012/0326436 A1  Dec. 27, 2012

(30) Foreign Application Priority Data
Mar. 5, 2010  (DE) .......................... 10 2010 010 522

(51) Int. Cl.
*F16L 37/00* (2006.01)
(52) U.S. Cl.
USPC .......................................... 285/308; 285/319
(58) Field of Classification Search
USPC ........................ 285/308, 312, 305, 319, 314
See application file for complete search history.

(56) References Cited

U.S. PATENT DOCUMENTS

| | | | | |
|---|---|---|---|---|
| 940,678 | A * | 11/1909 | Doane et al. | 285/319 |
| 1,966,718 | A * | 7/1934 | Hanson | 285/313 |
| 2,899,215 | A * | 8/1959 | Ardito | 285/308 |
| 4,108,475 | A * | 8/1978 | Fleischer | 285/320 |
| 4,875,711 | A * | 10/1989 | Watanabe | 285/319 |
| 5,131,687 | A | 7/1992 | Marchou | |
| 5,799,986 | A * | 9/1998 | Corbett et al. | 285/305 |
| 6,505,866 | B1 * | 1/2003 | Nakamura et al. | 285/423 |

(Continued)

FOREIGN PATENT DOCUMENTS

| | | |
|---|---|---|
| DE | 10 2005 011 777 | 9/2006 |
| DE | 20 2005 015 966 | 2/2007 |
| EP | 0 691 501 | 1/1996 |

OTHER PUBLICATIONS

International Search Report of PCT/EP2010/068806 Mailed on May 16, 2011 (4 pages).

*Primary Examiner* — David E Bochna
(74) *Attorney, Agent, or Firm* — Brinks Gilson & Lione

(57) ABSTRACT

A plug connector for media lines that includes a plug part having a plug shaft, which can be inserted into a receiving part and is releasably locked therein. The plug part has at least two spring elastic latching arms that extend in the insertion direction. The latching arms have radially inwardly projecting catch cams at their free ends for engaging behind a latching step of the receiving part. The latching arms can be spread radially by a release element to release the plug part. The latching arms are radially spread by displacing the release element. The release element has axially extending release arms, which extend to the area of the catch cams, located radially between the latching arms and the plug shaft. The actuating sections are arranged in such a way for spreading the latching arms to release the catch cams.

20 Claims, 5 Drawing Sheets

(56) References Cited

U.S. PATENT DOCUMENTS

| | | | |
|---|---|---|---|
| 7,044,506 B2 * | 5/2006 | Dong | 285/319 |
| 7,284,774 B2 * | 10/2007 | Bauer et al. | 285/319 |
| 7,658,420 B2 * | 2/2010 | Harger et al. | 285/314 |
| 7,770,938 B2 * | 8/2010 | Bauer | 285/305 |
| 7,850,210 B2 * | 12/2010 | Brandt et al. | 285/319 |
| 7,874,595 B2 * | 1/2011 | Lechner et al. | 285/305 |
| 8,146,956 B2 * | 4/2012 | Chaupin | 285/305 |
| 8,205,912 B2 * | 6/2012 | Takenaka et al. | 285/319 |

* cited by examiner

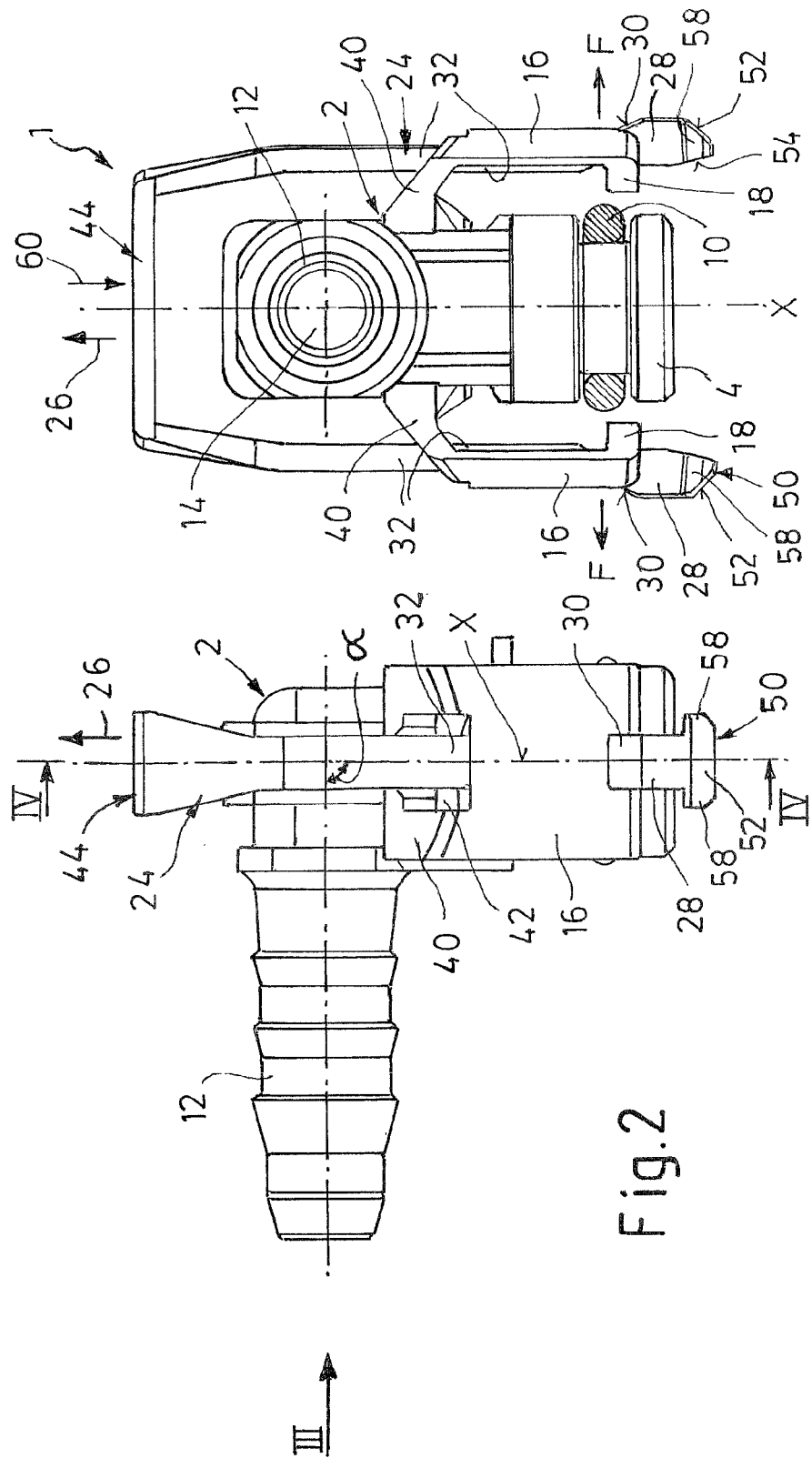

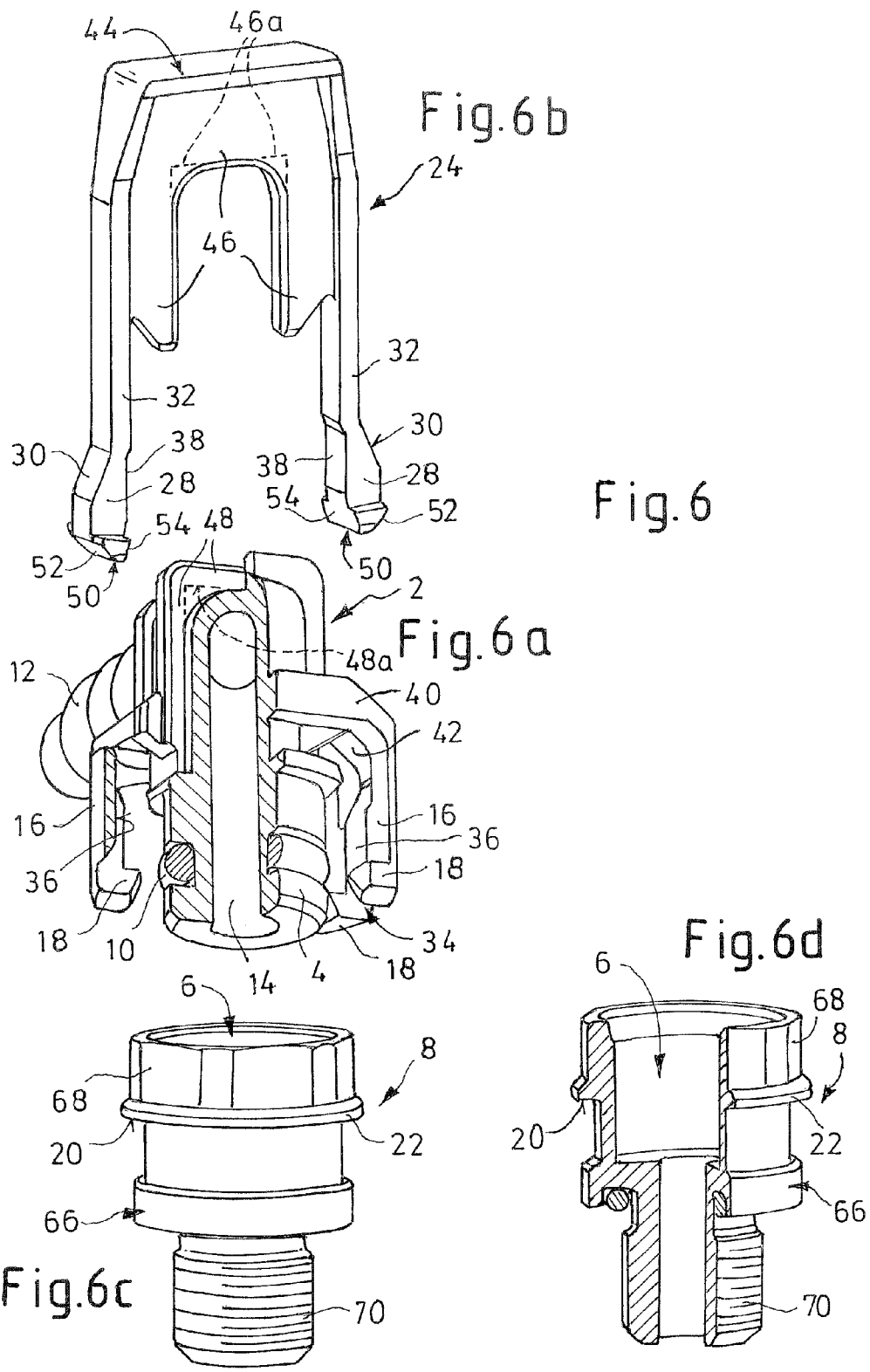

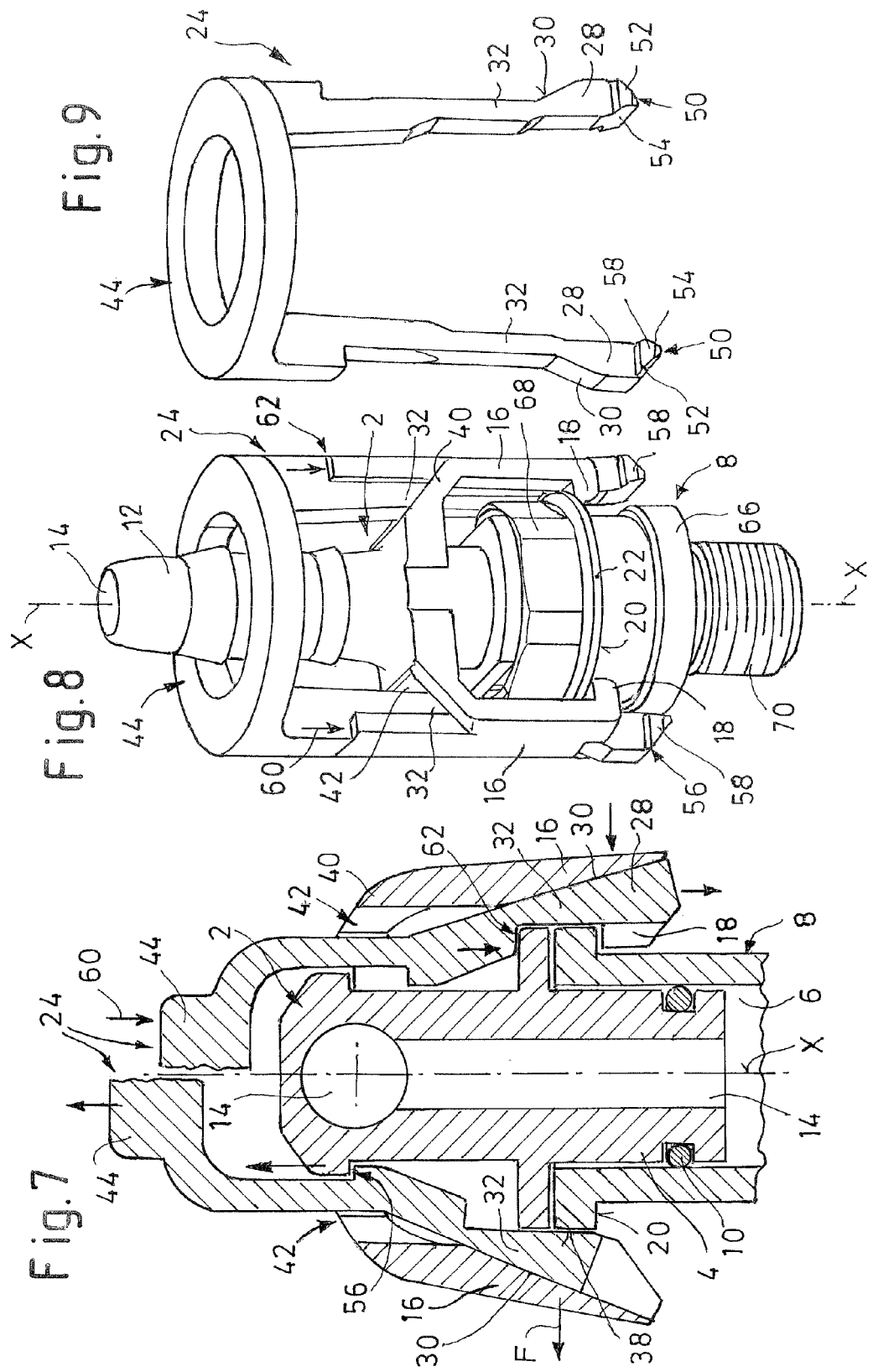

US 8,662,543 B2

PLUG-TYPE CONNECTOR FOR MEDIA LINES

BACKGROUND

1. Field of the Invention

The present invention relates to a plug connector for media lines (hose lines or pipelines for any desired pneumatic or hydraulic flow and/or pressurized media, such as gases or liquids) having releasable latch arms.

2. Related Technology

A plug connector is described in the publication EP 0 691 501 A1 (B2). In this known plug connector, the release element is radially latched from one side onto the plug part as spring elastic clamp-like clip element in such a way that the actuating sections with the angular faces for spreading the latching arms are located approximately in the central section of the latching arms between the catch cams and the side connected to the plug part. The release element must be grasped from the side, that is, from radial direction, in order to manually displace it, for which purpose it is provided with recessed grips on the outside. This embodiment does not result in optimal conditions for the introduction of the radial spreading force due to short operative lever arms. A large lateral free space is additionally necessary at the respective installation location in order to be able to manually grasp the release element. The known plug connector finally features an overall large design as a result of the special arrangement of the entire release element between the plug part and the latching arms.

The objective of the invention is to create a plug connector of the described kind, which ensures improved usage properties, in particular with regard to handling and introduction of the spreading force during release, with a compact design.

SUMMARY

Thus, according to the invention, the release element has release arms, which extend in axial direction within the radial area located between the latching arms and the plug shaft at least up to the area of the catch cams, wherein the actuating sections with the angular faces are arranged on the release arms for the purpose of spreading the latching arms in such a way that the latching arms are acted on for release with the spreading force in the direct vicinity of the catch cams. Thus, according to the invention, the location at which the radial spreading force is axially introduced into the free end area of the latching arms is thus relocated, so that a more advantageous ratio exists between lever arm and force.

In another preferred embodiment, the catch cam of each latching arm is provided with a central interruption, through which the respective release arm passes, wherein the actuating sections with the angular faces act against the latching arms in the area of the interruptions of the catch cams. Each latching arm is also suitably provided herein with a corresponding counter angular face, which acts against the angular face of the corresponding release arm in the area of the catch cam interruptions.

Each latching arm can additionally be provided on its inner side that faces toward the plug shaft with an axial, channel-like guide recess for the respective release arm of the release element. This guide recess migrates continuously into the interruption of the respective catch cam. As a result of this advantageous configuration, each release arm runs in radial direction into the respective guide recess in some sections, which also leads to a reduction of the radial dimensions and consequently to the altogether sought compact design of the plug connector.

It is furthermore advantageous if the release arms, which run parallel with respect to each other, are integrally connected via a grasping section in the area of the plug part located outside of the area axially opposite to the latching arms of the catch cams. For this purpose, each latching arm is provided with a feed through opening for the respective release arm of the release element in a base section integrally connected to the plug part and located axially opposite to the free end having the catch cam. The grasping section is accordingly advantageously arranged on the side axially opposite to the plug shaft, so that it can be easily grasped even in tight installation situations, and namely manually, for example, with the thumb and pointer finger or, however, by means of a suitable (commercially available) tool (for example, long nose pliers).

An advantageously slender design is attained with this embodiment according to the invention, wherein the axial displacement path of the release element can be selected to be as large as desired, because there is no restriction, such as possibly due to the length of the latching arms.

The handling of the plug connector according to the invention is easy and comfortable. The plug part can be grasped quite easily in the area of the release element and released from a locked position in which it is inserted in a receiving part and locked in position against unintentional release, and the unlocking takes place initially by pulling with a specific unlocking force in axial direction, while displacing the release element and in this way spreading the latching arms. The plug part is then released from the receiving part, that is, the plug shaft is extracted from the plug opening by means of a continuous pulling in the same direction with an extraction force, because the release element according to the invention reaches advantageously a specific displaced position at a pull end stop, so that the pulling or extraction force exerted on the release element is transferred to the entire plug part, whereby the plug part can be pulled out with its plug shaft, because the latching arms are in their spread release position in this pull end stop position, so that the catch is exposed and released. The release element can moreover be grasped for insertion in the area of its grasping section and the entire plug part can thus be inserted, because the release element is preferably also limited in its axial displacement movement in insertion direction of the plug part by means of a pressure end stop, and namely in a specific relative position, in which the latching arms are in an initial position in which they are not spread and are ready for locking the catch cams.

BRIEF DESCRIPTION OF THE DRAWINGS

The invention will be described in further detail in the following with the aid of the drawings and the preferred exemplary embodiments represented therein. In the drawings:

FIG. 2 shows a lateral view of the plug connector in arrow direction II according to FIG. 1, but without the receiving part, FIG. 3 shows a view in arrow direction III according to FIG. 2, FIG. 6 shows an exploded perspective representation of the individual parts in the partial FIGS. 6a to 6d, and namely FIG. 6a shows the plug connector in partial section without the release element, FIG. 6b shows the release element separately, FIG. 6c shows the receiving part in a preferred embodiment as adapter, and FIG. 6d shows a longitudinal section of the receiving part according to FIG. 6c, FIG. 7 shows a simplified schematic embodiment of the plug connector for the explanation of the functional principle, wherein the locked position is depicted in the right half of the drawing and the released position is depicted in the left half of the drawing, FIG. 8 shows an alternative embodiment of the plug connector according to the invention, and FIG. 9 shows a separate perspective view of the release element of the embodiment according to FIG. 8.

DETAILED DESCRIPTION

Figure 1:
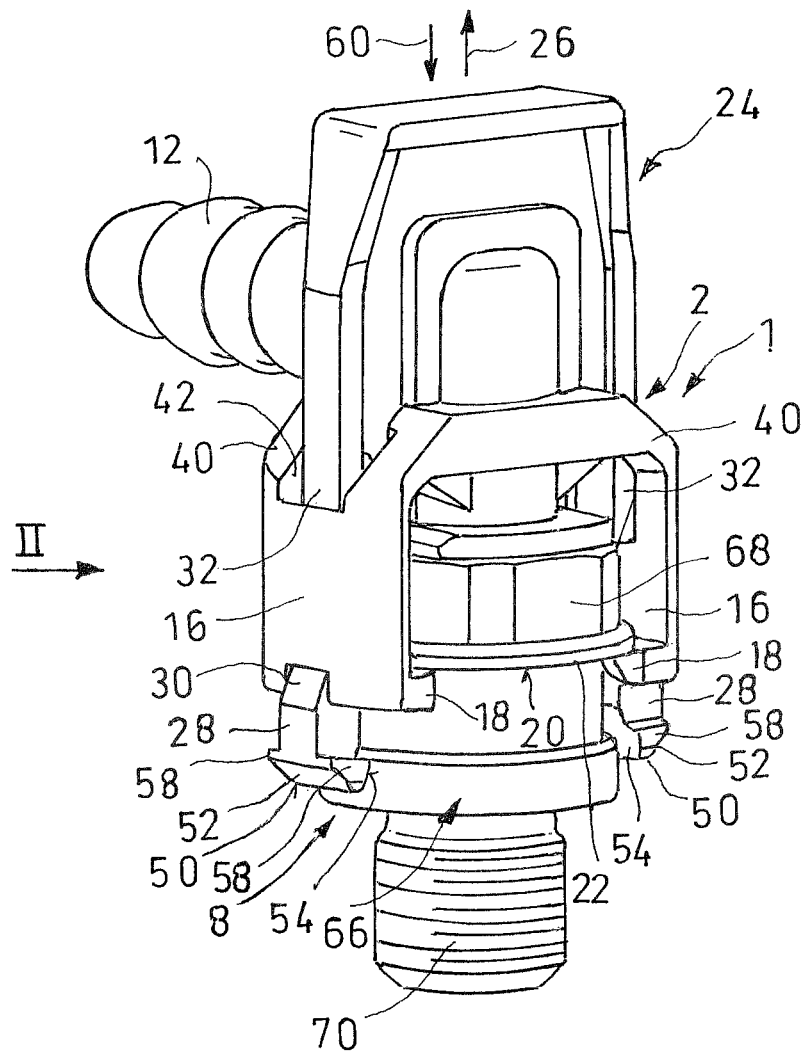
FIG. 1 shows a perspective view of a first embodiment of a plug connector according to the invention in inserted and locked position together with a receiving part.

The same parts are always provided with the same reference signs in the different figures of the drawings and are therefore as a rule only described once.

The plug connector 1 according to the invention includes a plug part 2 with a plug shaft 4. The plug shaft 4 can be inserted into a plug opening 6 of a receiving part 8 in direction toward a longitudinal axis X of the connector, and the plug part 2 can be releasably locked in this inserted position of the plug shaft 4 via locking means, that is, the plug connection is locked (secured) against unintentional release, but the locking can be reversed (unlocked), if needed, in order to release the plug connection. A peripheral seal 10, which is preferably arranged in an outer annular groove on the plug shaft 4, is provided in order to seal the plug connection.

The plug part 2 serves for connecting (at least) one media line (hose line or pipeline), which is not represented, to the receiving part 8. For this reason, the plug part 2 consists of a connecting section, which migrates on one side into the plug shaft 4 and has at least one line connection 12 especially in the form of a so-called connecting pin on the other side. However, the line connection 12 can also be alternatively configured analogously to the receiving part 8 with a corresponding plug opening 6 and an embodiment that will be described in more detail in the following (cf. in particular the reference signs 20, 22), so that the plug connector 1 forms, for example, an angular adapter. In the embodiment according to FIGS. 1 to 9 the plug connector 1 is designed as an angle connector, wherein the line connection 12 is aligned at an angle α (see FIG. 2) of in particular approximately 90° with respect to the longitudinal axis of the plug shaft 4. According to FIG. 8, the plug connector 1 can however also be a through connector, wherein the line connection 12 is arranged in opposite direction with respect to the longitudinal axis of the plug shaft 4. An inner through channel 14 (see FIGS. 3, 4, 5, 6a and 7) runs through the line connection 12, the connecting section, and the plug shaft 4.

The plug part 2 has preferably two mutually diametrically opposite lying spring elastic latching arms 16 as locking means, which extend in the plugging direction respectively at a radial distance with respect to the plug shaft 4 and have radially inwardly projecting catch cams 18 at their free ends for the purpose of locking the plug part 2 with the receiving part 8 in the inserted condition of the plug shaft 4. In the inserted state—see in particular FIGS. 1, 4, 7 and 8—the latching arms 16 engage with the catch cams 18 behind a radial latching step 20 of the receiving part 8; it is a so-called snap-type positive fit connection, because the catch cams 18 interact with the latching step 20 via operative surfaces with an undercut angle of >90°. The latching step 20 of the receiving part 8 is preferably formed by a circumferential radially outwardly extending annular web 22. The catch cams 18 have angular faces that are such that the latching arms 16 are automatically spring elastically spread in radially outward direction when the plug shaft 4 is inserted into the plug opening 6 by means of the application on the annular web 22 of the receiving part 8 until the catch cams 18 snap behind the latching step 20. The plug part 2 is secured in this way against unintentional release. However, the plug part 2 can again be subsequently released, that is, pulled out, for which purpose the latching arms 16 can be radially outwardly spread by means of a release element 24. For this purpose, the release element 24 can be axially displaced and permanently guided along the plug part 2, and the release element 24 interacts herein in such a way with the latching arms 16 that the latching arms 16 are radially spread by means of an axial displacement—corresponding to the longitudinal axis X of the connector—of the release element 24 in extraction direction (arrow 26) of the plug part 2, in that the release element 24 acts radially from inside via angular faces 30 with a radial spreading force F—produced according to the principle of the angular faces 30—of the release element 24 against the latching arms 16 with respectively one actuating section 28. For this purpose, the angular faces 30 of the release element 24 are aligned in such a way transversely to the longitudinal axis that the actuating sections 28 are spread radially outwardly in insertion direction via the angular faces 30.

The release element 24 is provided according to the invention with release arms 32, which extend in axial direction in the radial region between the latching arms 16 and the plug shaft 4 at least up to the area of the catch cams 18. The already mentioned actuating sections 28 with the angular faces 30 are to be arranged in such a way on the release arms 32 for spreading the latching arms 16 that the latching arms 16 can be acted upon with the spreading force F for the release in the area of the catch cams 18. Reference is especially made for this purpose to the sectional views shown in FIGS. 4 and 7.

Figure 5:
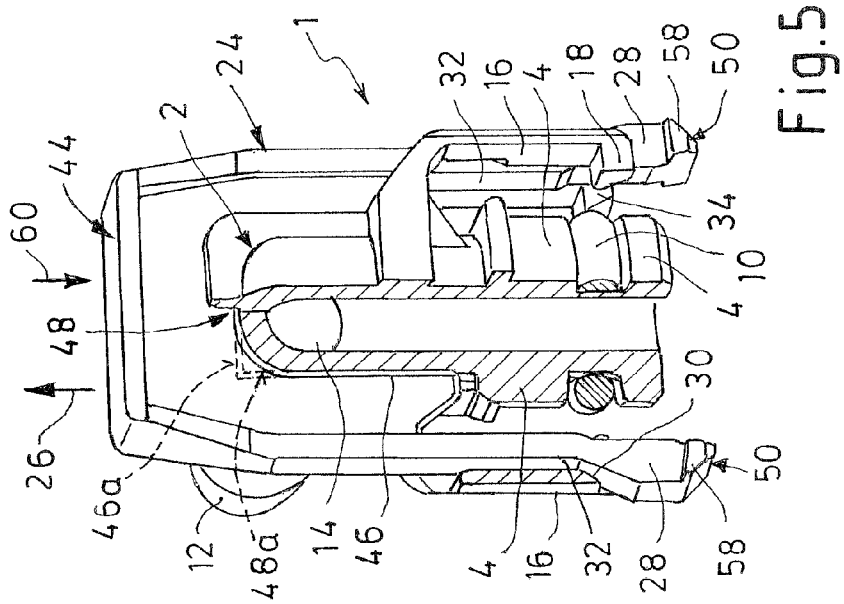
FIG. 5 shows another perspective view in partial section of the plug connector according to FIGS. 1 to 4 without the receiving part.
Figure 4:
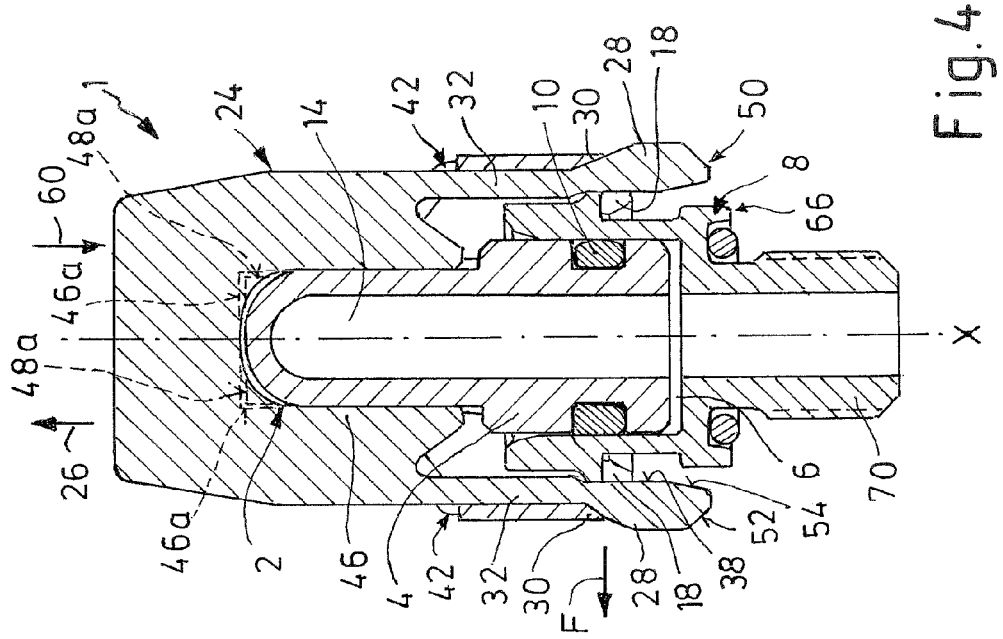
FIG. 4 shows a total section through the plug connector with the receiving part within the plane IV-IV according to FIG. 2.

As can be seen best in FIG. 5, each catch cam 18 extending over an overall specific peripheral area has a central interruption 34, through which the respective release arm 32 passes. The actuating sections 28 of the release arms 32 act against the latching arms 16 with the angular faces 30 in the region of these interruptions 34 of the catch cams 18.

Each latching arm 16 is also suitably provided in this area with a corresponding counter angular face (see in this connection also in particular the representation of FIG. 5).

In another advantageous embodiment—see in this connection in particular FIG. 6a—each latching arm 16 has an axial channel-like guide recess 36 for the respective release arm 32 of the release element 24 on its inner side that faces toward the plug shaft 4. The guide recess 36 migrates therein constantly into the interruption 34 between the catch cams 18. Each release arm 32 passes thus through the respective guide recess 36 and then further through the interruption 34 of the catch cams 18. The channel-like guide recesses 36 can be configured as guide grooves, in such a way that the release arms 32 are positively guided.

To ensure that the release arms 32 can bring about the spreading force F for the latching arms 16 via the angular faces 30 with a movement in arrow direction 26, they must be radially inwardly supported. For this purpose, the release arms 32 are provided with radially inner support surfaces 38 for radially inward support by means of the abutment against the plug part 2 and/or on the receiving part 8 during the spreading procedure of the latching arms 16. In the embodiment according to FIGS. 1 to 6, the support surfaces 38 only interact with the receiving part 8 in that they abut in particular against the annular web 22; see in particular to FIG. 4 with regard to this.

FIG. 7 shows instead as an example that the support surfaces 38 abut against the receiving part in the area of the annular web 22 that forms the latching step 20 as well as also in addition on the plug part 2 in the area of a radial projection. An abutment of the support surfaces 38 only against suitable sections of the plug part 2 can basically also be provided.

In another preferred embodiment, each latching arm 16 is integrally connected via a base section 40 to the plug part 2 in its area axially opposite to the catch cam 18. In the area of each base section 40 is now formed a window-like through opening 42 for the respective release arm 32 of the release element 24. In this way, the release arms 32 that run parallel with respect to each other can be connected as one piece via a grasping section 44 in the area of the plug part 2 that is axially opposite to the catch cams 18 on the outside of the latching arms 16.

In a first embodiment according to FIGS. 1 to 6, the release element 24 is configured as an overall approximately U-shaped slide with two parallel release arms 32 and one connecting web functioning as connecting web and configured as a grasping section 44. The release element 24—see in particular FIG. 6b—has herein an inner web-like guide section 46, which can be displaced and securely guided against tipping within a groove-like guide contour 48 of the plug part 2. In the represented exemplary embodiment, the guide contour 48 is rounded in the area of the inner angle of the U-shaped guide section 46. However, as indicated with dashed lines as an example in FIGS. 4 and 5 as well as in FIGS. 6a and 6b, an extension of the operative guide length can be attained by means of a rectangular contour 48a of the groove-like guide 48 and a corresponding rectangular counter contour 46a of the guide section 46.

The U-shaped embodiment of the release element 24 is especially suitable for the angular connector according to FIGS. 1 to 6, since the grasping section 44 of the plug part 2 can diametrically overlap the plug shaft 4 with respect to the longitudinal axis.

In the case of the through connector represented in FIG. 8, the grasping section 44 connecting the release arms 32 is formed by a ring part, which encloses at a distance the line connection 12, either concentrically fully open (for example, in the form of a closed ring) or peripherally partially open (for example, in the form of a semicircle). The radial distance between the line connection 12 and the ring-shaped grasping section 44 is dimensioned in such a way that a line can be fitted on the connection 12.

A release element similar to the one in the embodiment according to FIGS. 1 to 6 can alternatively be used for a through connector such as the one of FIG. 8, if the grasping section 44 relative to the release arms 32 and the central plane defined by these is offset to one side, that is, cropped, in such a way that it is arranged with sufficient distance beside the line connection 12. An offset between the grasping section 44 and the line connection 12 is designed and dimensioned in such a way that a line can be fitted on the connection 12.

The release element 24 can also be produced together with the plug part 2 with the method of so-called assembly injection molding. For this purpose, the plug part 2 is preferably made from a first material in a first step, preferably PA, and the release element 24 is injection molded from a second material in a second step. This second material, for example, PP, PE, POM, has a lower melting temperature than that of the first material of the plug part 2, and therefore an integral connection to the first material of the plug part 2 does not formed. The production process is qualitatively improved in this way, since the assembly is simplified and the logistics expenditure is reduced.

As is furthermore shown in the figures of the drawing, each release arm 32 of the release element 24 has a guide section 50 having radial inner and outer angular faces 52, 54, which extend beyond the free end of the respective latching arm 16 and over the catch cam 18. The outer angular faces 52 serve herein as insertion chamfers during the assembly of the release element 24, that is, during the insertion of the release arms 32 through the through openings 42 of the base section 40 of the latching arms 16. Through the inner angular faces 54 it is ensured that the release arms 32 cannot impede the insertion procedure, but that they are guided via the angular faces 54 with their support surfaces 38 for support on the peripheral contour, in particular the annular web 22, of the receiving part 8.

In order to be able to utilize the release element 24 via its grasping section 44 also for handling during the insertion and release of the entire plug part 2, it is provided in another advantageous embodiment that the release element 24 is limited in its axial displacement movement in release direction of the plug part (arrow 26) by means of a pull end stop 56, and namely in a relative position in which the latching arms 16 are in a spread release position. In a preferred embodiment according to FIGS. 1 to 6, the pull end stop 56 is formed between approximately T-shaped expanded sections 58 in the area of the guide sections 50 of the release arms 32 and free end faces of the latching arms 16. As results, for example, from FIGS. 3 and 5, the expanded sections 58 abut against the lower front faces of the latching arms 16 after a pulling movement in arrow direction 26.

The release element 24 is furthermore limited in its axial displacement movement also in insertion direction of the plug part (arrows 60) by means of a pressure end stop 62, and namely in a relative position in which the latching arms 16 are in an initial position in which they are not spread and are ready for spring elastic locking. In the configuration according to FIGS. 1 to 6, the pressure end stop 62 is formed on the side of the plug part 2 that faces toward the grasping section 44 by means of the guide section 46, which engages in the guide contour 48.

FIGS. 7 and 8 show possible alternatives for the realization of the end stops 56, 62, which should be understandable even without further explanations.

In the represented exemplary embodiments, the receiving part 8 is configured as connection adapter 66, wherein this adapter 66 has initially a hexagon head 68 preferably adjacent to the outlet side of the plug opening 6, and adjacent thereto the latching step 20 as well as a screwing section 70 opposite to the plug opening 6. Instead of the hexagonal head 68 can also be provided any other desired outer force engagement for a rotary tool. This configuration facilitates the assembly of the adapter 66, since the screwing can be carried out by means of a conventional socket wrench. The screwing section 70 is configured as a threaded bushing with outer thread. This arrangement leads to an advantageous optimization of the installation space, since the hexagonal head 68 is covered by the plug part 2 and thus reduces the height of the installation space of the plug connector 1.

The plug part 2 together with the latching arms 16 is suitably formed as an integral piece of molded plastic with the latching arms 16. The same applies also for the release element 24 with its release arms 32.

In another advantageous embodiment, a rifling or similar contour is preferably provided on both sides of the area of the grasping section 44 of the release element 24 in order to obtain an improved "grip" for manual assembly. The release element 24 can also have an opening to make possible the use of a suitable auxiliary tool during assembly and disassembly.

In a deviation from the previously described exemplary embodiments, in which two latching arms 16 and correspondingly also two release arms 32 are provided, the plug connector 1 according to the invention can also have more than two latching arms 16 with a corresponding number of release arms 32.

The invention is not limited to the represented and described exemplary embodiments, but also comprises all of the similarly functioning embodiments in the sense of the invention. It is expressly emphasized that the exemplary embodiments are not limited to all of the features in combination, but rather each individual partial feature detached from all other partial features also has inventive importance per se. The invention is furthermore also not limited to the feature combination defined in the independent claim, but can also be defined by any other desired combination of specific features of all overall disclosed individual features. This means that basically practically each individual feature of the independent claim can be omitted or replaced by means of at least one individual feature disclosed in another location of the application. The claims are merely to be understood as a first formulation attempt of an invention.

We claim:

1. A plug connector for media lines, comprising a plug part having a plug shaft, which can be inserted in a plug opening of a receiving part and releasably locked via locking means, wherein the plug part has at least two spring elastic latching arms as the locking means, which extend in the insertion direction at a radial distance with respect to the plug shaft and have radially inwardly projecting catch cams at their free ends for lockingly engaging behind a latching step of the receiving part, wherein the latching arms can be spread radially outwardly by means of a release element in order to release the locking of the plug part, the release element is axially displaceably arranged on the plug part and interacts in such a way with the latching arms that the latching arms are radially spread apart by displacing the release element in that the release element acts radially from inside with a spreading force (F) provided by actuating sections against the latching arms via angular faces, the release element has axially extending release arms, which extend at least up to the area of the catch cams, in the area located radially between the latching arms and the plug shaft, wherein the actuating sections with the angular faces are arranged in such a way that the latching arms are acted upon with the spreading force (F) to release the catch cams from the receiving part.

2. The plug connector according to claim 1, wherein the catch cam of each latching arm has a central interruption, through which a respective one of each of the release arms passes, wherein the actuating sections with the angular faces act against the latching arms in the region of the interruptions of the catch cams.

3. The plug connector according to claim 1, wherein each latching arm has an axial channel-like guide recess on its inner side that faces toward the plug shaft for the respective release arm of the release element.

4. The plug connector according to claim 1, wherein the release arms have radially inner support surfaces for radial supporting abutment against at least one of the plug part and the receiving part during the spreading of the latching arms.

5. The plug connector according to claim 1, wherein each latching arm has a through opening for a respective one of the release arms of the release element in a base section integrally connected to the plug part axially opposite to its free end having the catch cam.

6. The plug connector according to claim 1, wherein the release arms extend parallel with respect to each other and are integrally connected outside of the latching arms via a grasping section in the area axially opposite to the catch cam.

7. The plug connector according to claim 1, wherein the release element is generally configured in a U-shape with two release arms and a connecting web that functions as grasping section and connects said release arms.

8. The plug connector according claim 7, wherein the release element has an inner web guide section, which can be displaced and is guided against tipping within a groove guide contour of the plug part.

9. The plug connector according to claim 8, wherein the angular connector has an angle of about 90°.

10. The plug connector according to claim 7, wherein the plug part is configured as an angular connector and has at least one line connection, which runs at an angle ($\alpha$) of less than 180° with respect to the longitudinal axis of the plug shaft, wherein the connecting web of the release element that forms the grasping section diametrically overlaps a transition section between the plug shaft and the line connection with respect to the longitudinal axis of the plug shaft.

11. The plug connector according to claim 1, wherein the plug part is configured as a through connector having a line connection, which extends in an opposite direction corresponding to the longitudinal axis of the plug shaft, wherein a grasping section of the release element connects the release arms and is formed as one of a ring part that concentrically encloses at a radial distance the line connection or is arranged offset relative to the release arms and a longitudinal axis (X) of the connector in an area located at a distance beside the line connection.

12. The plug connector according to of claim 1, wherein each release arm of the release element has a guide section with radially inner and outer angular faces extending axially over the free end of the latching arm and the catch cam.

13. The plug connector according to claim 1, wherein the release element is limited in its displacement movement in release direction of the plug part by means of a pull end stop formed on the release element.

14. The plug connector according to claim 13, wherein the pull end stop is formed on the release arms at a location between generally T-shaped expanded ends of the release arms, which axially project over the latching arms, and free end faces of the latching arms.

15. The plug connector according to claim 13, wherein the pull end stop is positioned in a location so as to be engaged when the latching arms are in a spread release position.

16. The plug connector according to claim 1, wherein the release element is limited in the insertion direction of the plug part by means of a pressure end stop.

17. The plug connector according to claim 16, wherein the pressure end stop is formed by means of abutment faces of the release element and the plug part.

18. The plug connector according to claim 17, wherein the abutment faces of the release element and the plug part are located in an area positioned outside of the latching arms and on a side opposite of the catch cams.

19. The plug connector according to claim 16, wherein the pressure end stop is positioned in a location so as to be engaged when the latching arms are in an initial position where they are not spread and are ready for locking the catch cams.

20. The plug connector according to claim 1, wherein the receiving part has first a tool force engagement portion located adjacent to the latching step and has a screw section located opposite of the plug opening.

* * * * *